United States Patent
Wang et al.

(10) Patent No.: US 9,422,145 B2
(45) Date of Patent: Aug. 23, 2016

(54) CHILD SAFETY FAUCET

(71) Applicant: MTN PRODUCTS, INC., La Verne, CA (US)

(72) Inventors: Chun Yen Wang, El Pas, TX (US); Tony Xiao, Shenzhen Guangdong (CN)

(73) Assignee: MTN Products, Inc., La Verne, CA (US)

( * ) Notice: Subject to any disclaimer, the term of this patent is extended or adjusted under 35 U.S.C. 154(b) by 253 days.

(21) Appl. No.: 14/071,892

(22) Filed: Nov. 5, 2013

(65) Prior Publication Data
US 2015/0122831 A1 May 7, 2015

(51) Int. Cl.
*B67D 3/04* (2006.01)
*F16K 35/02* (2006.01)
*B67D 3/00* (2006.01)

(52) U.S. Cl.
CPC ............. *B67D 3/043* (2013.01); *B67D 3/0029* (2013.01); *F16K 35/025* (2013.01); *B67D 2210/00118* (2013.01)

(58) Field of Classification Search
USPC ........... 251/98, 99, 107, 108, 109, 110, 263; 222/153.14, 469, 509, 518
See application file for complete search history.

(56) References Cited

U.S. PATENT DOCUMENTS

| | | | | |
|---|---|---|---|---|
| 994,955 A * | 6/1911 | Sayre | ..................... | F16K 29/00 137/243.7 |
| 1,395,678 A * | 11/1921 | Jones | ..................... | F16K 35/10 251/98 |
| 3,138,331 A * | 6/1964 | Kutik | .................. | B65D 83/206 222/182 |
| 5,449,144 A | 9/1995 | Kowalics | | |
| 5,470,044 A * | 11/1995 | Chi | ....................... | F16K 35/025 222/153.1 |
| 6,082,598 A * | 7/2000 | Lee | ....................... | B67D 1/125 222/153.14 |
| 6,086,045 A | 7/2000 | Moon | | |
| 6,880,797 B2 * | 4/2005 | Yui | ....................... | F16K 35/025 251/103 |
| 6,962,319 B2 * | 11/2005 | Zheng | .................. | B67D 1/1466 222/153.14 |
| 8,418,991 B2 | 4/2013 | Meyer | | |
| 8,418,992 B2 | 4/2013 | Meyer | | |
| 2003/0001124 A1 * | 1/2003 | Chen | ..................... | F16K 35/025 251/113 |

* cited by examiner

*Primary Examiner* — Kevin Murphy
*Assistant Examiner* — Jonathan Waddy
(74) *Attorney, Agent, or Firm* — Michael P. Mazza, LLC

(57) ABSTRACT

A liquid dispensing apparatus with a child-safety feature which, in one preferred embodiment, does not permit dispensing unless both a dispensing handle and an associated lever are each independently moved. In another embodiment, dispensing is prevented unless a manually-depressable, rotatable dispensing lever and a rotatable safety lock are both simultaneously actuated.

15 Claims, 14 Drawing Sheets

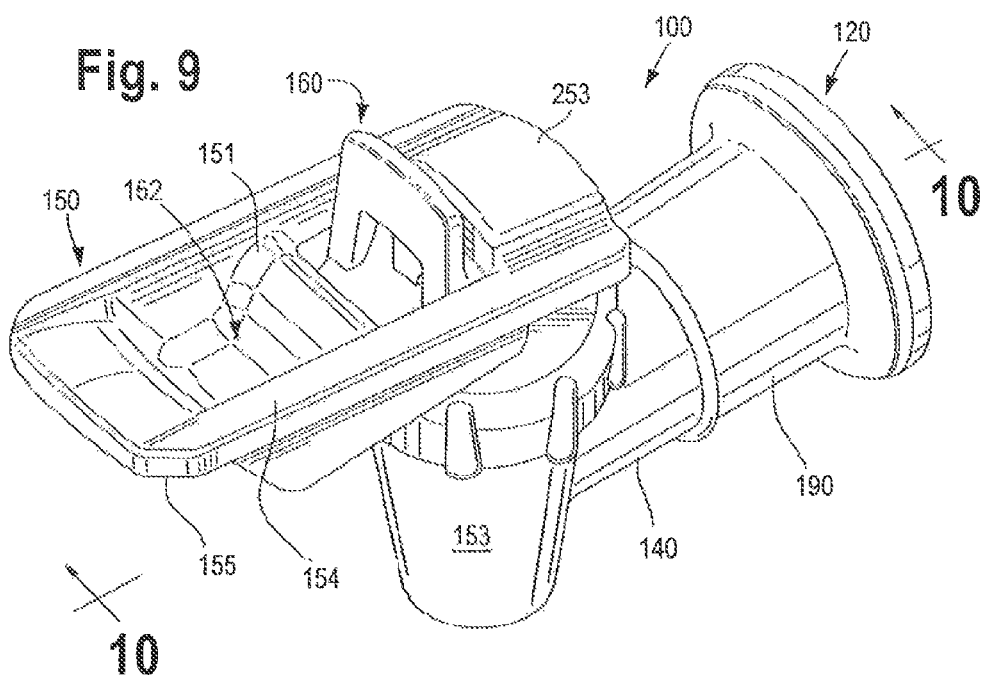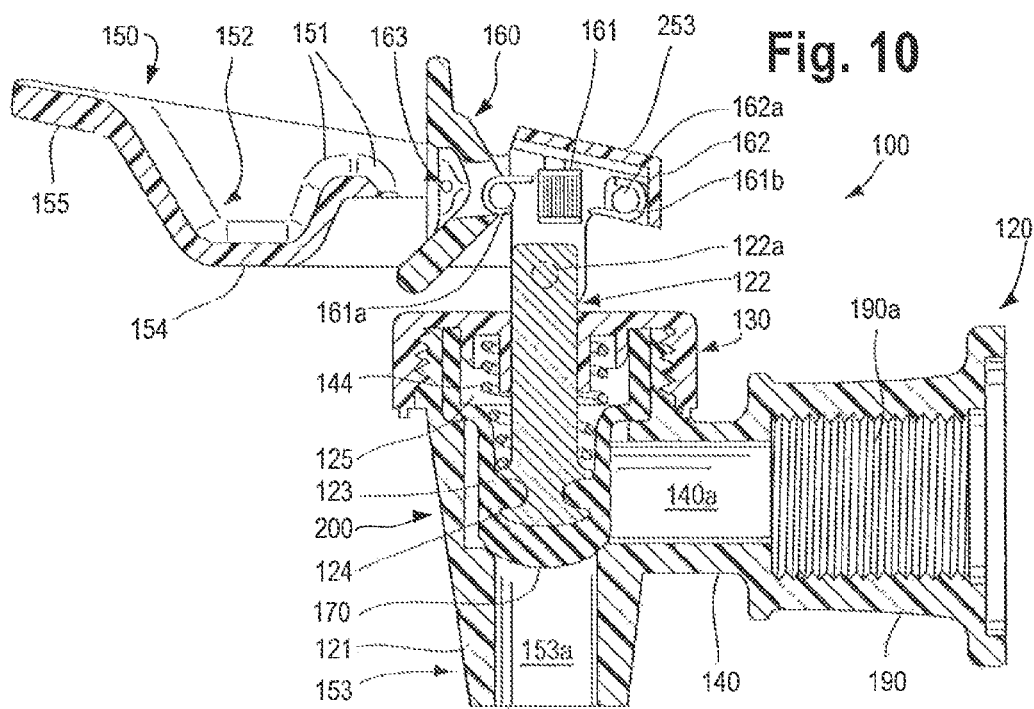

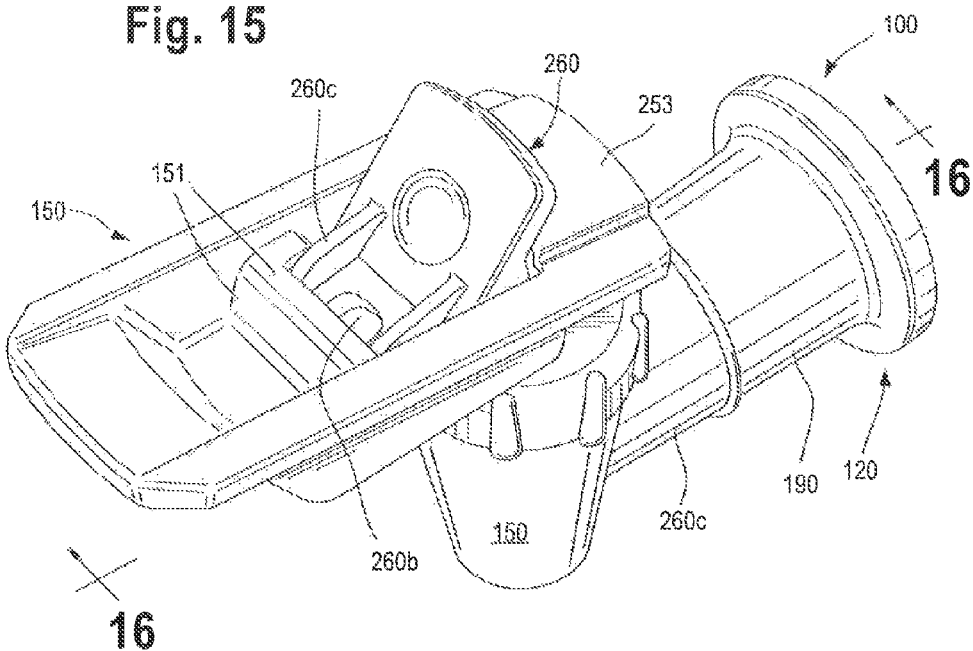
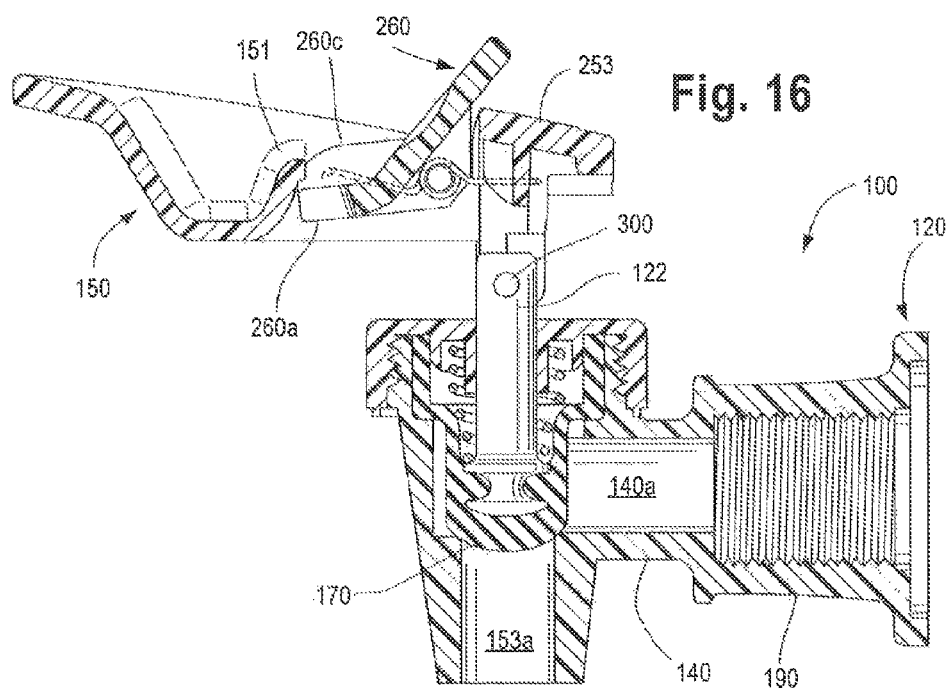

CHILD SAFETY FAUCET

BACKGROUND OF THE INVENTION

The present invention generally relates to a dispensing valve for use in dispensing liquid from liquid containers and, more specifically, a dispensing valve with an improved operating handle.

The invention is especially useful for use with valves intended for dispensing hot fluids, and will be described with reference to this function. However, it will be understood that dispensing valves of the invention may be used in many environments for controlling different types of fluids.

A common and well known type of dispensing valve or faucet used for controlling the dispensing of fluids such as coffee, water and other beverages includes a faucet body with a downwardly-directed outlet in which fluid movement through the faucet body is controlled by an internal valve joined to an upwardly extending stem. The stem may extend out of the body through a bonnet, and movement of the stem may be controlled by a manually-operated cam actuator pivotally joined to the stem and acting against the bonnet.

A problem sometimes encountered with this general class of valves is the possibility of undesired discharge of fluid caused by inadvertent bumping of the dispensing actuator. The seriousness of the inadvertent dispensing depends, of course, on the nature of the fluid and the surrounding environment. For example, if a small child were to jostle a water cooler faucet and inadvertently dispense hot water, the consequences could be quite serious.

With a conventional faucet, the handle may be actuated through the carelessness of a small child or a slight, inadvertent touch to dispense hot water or other liquids, with potentially serious consequences. This is because with the handle of the conventional faucet actuated by leverage, the force point of the lever corresponds to the support point of the lever, and liquid is discharged simply by pushing the handle down.

It is also known to provide dispensing faucets with safety handles, as disclosed in U.S. Pat. No. 5,449,144 to Kowalics, and U.S. Pat. No. 6,086,045 to Moon, the entire disclosures of each of which are hereby incorporated by reference herein. While there are safety advantages associated with these handles, difficulties have been encountered in operating handles of these types. For example, it can he physically cumbersome or awkward to actuate such faucets, and then to maintain such faucets in position during dispensing.

U.S. Pat. Nos. 5,449,144, 8,418,991 and 8,418,992, commonly assigned to The Meyer Company, also disclose dispensing faucets with safety handles. These are also physically cumbersome to actuate, requiring the thumb and index finger to squeeze together to disengage the safety lock, and then twisting the wrist to dispense.

Accordingly, a need continues to exist for an improved safety handle/actuator arrangement for dispensing liquids, which overcomes the above-referenced problems, while retaining advantages of such faucets.

SUMMARY OF THE INVENTION

In one preferred embodiment of the present invention, a liquid dispensing apparatus with a child-safety feature is provided, and includes a valve with inlet and outlet passageways. Preferably, the valve inlet passageway is in fluid communication with a source of liquid to be dispensed, and the valve outlet passageway terminates in a nozzle or other suitable dispensing end. The apparatus also includes a manually-manipulable dispensing handle, and a manually-manipulable lever that is independently movable of the dispensing handle. Moving the dispensing handle without independently moving the lever will not allow liquid dispensing to occur through the valve outlet passageway.

In a particularly preferred embodiment, the apparatus may also include a stopper engaging the lever, and a spring-loaded pad, such that when the handle and the lever are each independently moved, the stopper constrains movement of the pad. The apparatus may also include a plunger capable of movement between dispensing and non-dispensing positions, such that when. the handle and the lever are each independently moved and the stopper constrains movement of the pad, the plunger is moved to a dispensing position allowing liquid to be dispensed through the valve outlet passageway.

In a preferred embodiment, the lever may normally be spring-biased in a neutral, non-liquid dispensing position when the lever is not being manually manipulated. Similarly, the pad may be spring-biased in a neutral, non-liquid dispensing position when the lever is not being manually manipulated. When only the handle and not the lever is manually manipulated, the plunger may be maintained in the non-dispensing position. In one embodiment, the handle may be rotated about a pivot comprising the pad. Preferably, the lever is capable of rotating with the handle.

The liquid to be dispensed may be hot and/or cold and/or sparkling water, beverages such as coffee, soda, or other liquids.

In an alternative embodiment of the present invention, a method of safely dispensing a liquid includes the steps of providing a valve having inlet and outlet passageways, with the valve inlet passageway being in fluid communication with a source of liquid to be dispensed, and the valve outlet passageway terminating in a nozzle or other suitable dispensing end; providing a manually-manipulable dispensing handle and a manually-manipulable lever; and providing a plunger that is normally located in a non-dispensing position blocking the valve outlet passageway. By independently moving both the dispensing handle and the lever, the plunger is moved to a dispensing position in which the plunger no longer blocks the valve outlet passageway, allowing liquid to be dispensed through the valve outlet passageway, Conversely, moving the dispensing handle without independently moving the lever will not cause the plunger to unblock the valve outlet passageway. A stopper may be provided for engaging the lever, and a spring-loaded pad may also be provided, such that when the handle and the lever are each independently moved, the stopper constrains movement of the pad, and the plunger is moved to the dispensing position. Preferably, when only the handle and not the lever is manually manipulated, the plunger is maintained in the non-dispensing position. Also, preferably, the handle can be rotated about a pivot on the pad, and the lever can be rotated with the handle.

In yet another preferred embodiment of the invention, a faucet assembly for liquid dispensing is provided which includes: (a) a valve having inlet and outlet passageways, with the valve inlet passageway being in fluid communication with a source of liquid to be dispensed, and the valve outlet passageway terminating in a nozzle or other suitable dispensing end; (b) a manually-depressable, rotatable dispensing lever, with the lever supporting a rotatable safety lock; and (c) an operating stem having first and second ends, with the first end suitable shaped and sized for releasably blocking fluid passage between the valve inlet and valve outlet passageways, and the second end pivotably connected to the dispensing lever. In a particularly preferred embodiment, the valve may include a bonnet, an upper portion of the valve may be engaged to the bonnet, and the operating stem may pass through a central portion of the bonnet.

With this embodiment, dispensing may only be actuated by rotating both the child safety lock and the dispensing lever, thereby removing the first end of the operating stem from a position blocking fluid passage between the valve inlet and valve outlet passageways. Preferably, the operating stem is spring-loaded so as to be normally maintained in a neutral position in which the first end of the operating stem blocks fluid passage between the valve inlet and valve outlet passageways. Following the actuation of dispensing, continued dispensing may be made to occur by continuing to depress the dispensing lever, and not the safety lock. The first end of the operating stem may be connected to a valve element.

Preferably, an upper surface of the dispensing lever may be suitably shaped and provided with a concave configuration so as to easily accommodate depression and subsequent rotation of the dispensing lever using the human thumb or fingers. This allows depression and rotation of the dispensing lever to be easily accomplished without also causing depression and rotating of the safety lock.

In the preferred embodiment, dispensing is actuated only upon rotation of the dispensing lever and the safety lock in the same direction, and the safety lock is normally spring-biased in a neutral position in which dispensing cannot occur. With this embodiment, manual exertion of a force on the safety lock causing rotation, without also manually exerting a force on the dispensing lever causing rotation, will not cause the faucet assembly to dispense the liquid. Similarly, manual exertion of a force on the dispensing lever causing rotation, without also manually exerting a force on the sty lock causing rotation, will not cause the faucet assembly to dispense the liquid. In this embodiment, when the safety lock is in the neutral position, attempting to depress and rotate the dispensing lever will. result in insufficient rotation of the dispensing lever to actuate dispensing. Also, when the safety lock is in the neutral position, attempted depression and rotation of the dispensing lever will insufficiently rotate the dispensing lever to actuate dispense due to an end of the safety lock abutting the valve.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 9 is a top and side perspective view of a second embodiment of the safety dispensing apparatus of the present invention;

FIG. 10 is a side sectional view of FIG. 9;

FIG. 15 is a top and side perspective view of a third embodiment of the safety dispensing apparatus of the present invention; and FIGS. 16-17 are side, cross-sectional view of the safety dispensing apparatus of FIG. 15, shown in closed, non-dispensing positions;

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed, Future and present alternatives and modifications to this preferred embodiment are contemplated, Any alternatives or modifications which make insubstantial changes in function, in purpose, in structure, or in result are intended to be covered by the claims of this patent.

Figure 1:
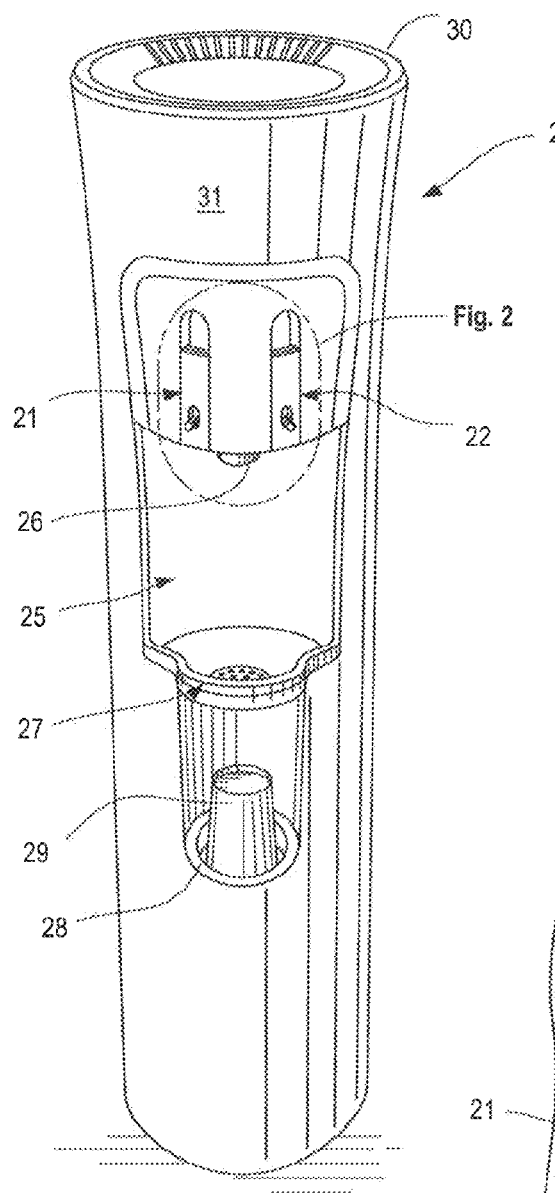
FIG. 1 is a front and top perspective view of one preferred water cooler with a preferring dispensing apparatus according to one aspect of the present invention.
Figure 2:
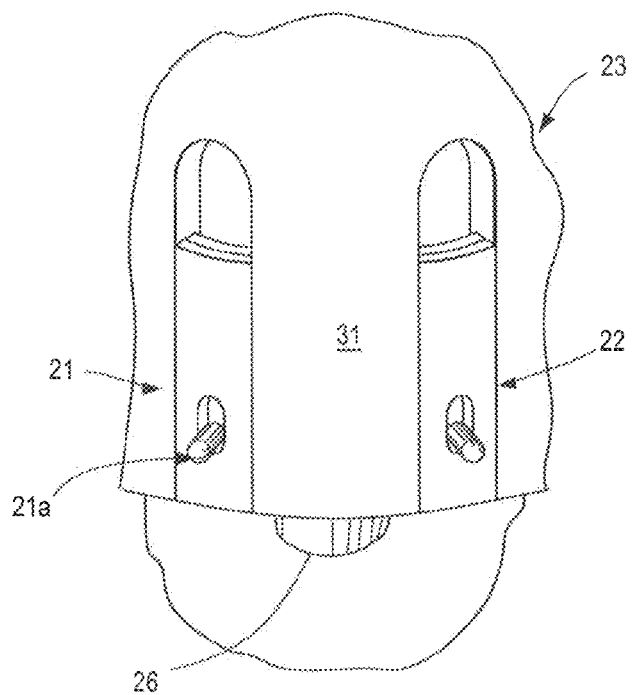
FIG. 2 is an enlarged perspective view of the circled portion of FIG. 1.

Referring now to FIGS. 1-2, one preferred embodiment of water cooler 20 is shown. Water cooler 20 may include a top 30 and a circular side 31. This exemplary embodiment includes dispensing apparatus 23 with hot water child safety dispensing handle 21 and protruding child safety pin/lever 21a, and cold water dispensing lever 22, each of which are located within alcove 25, dispensing nozzle or faucet 26, drip tray 27 located at the bottom of alcove 25, and cup holder 28 for cups 29. Top 30 of cooler 20 may taper downwardly to accommodate an inverted water bottle.

Figure 3:
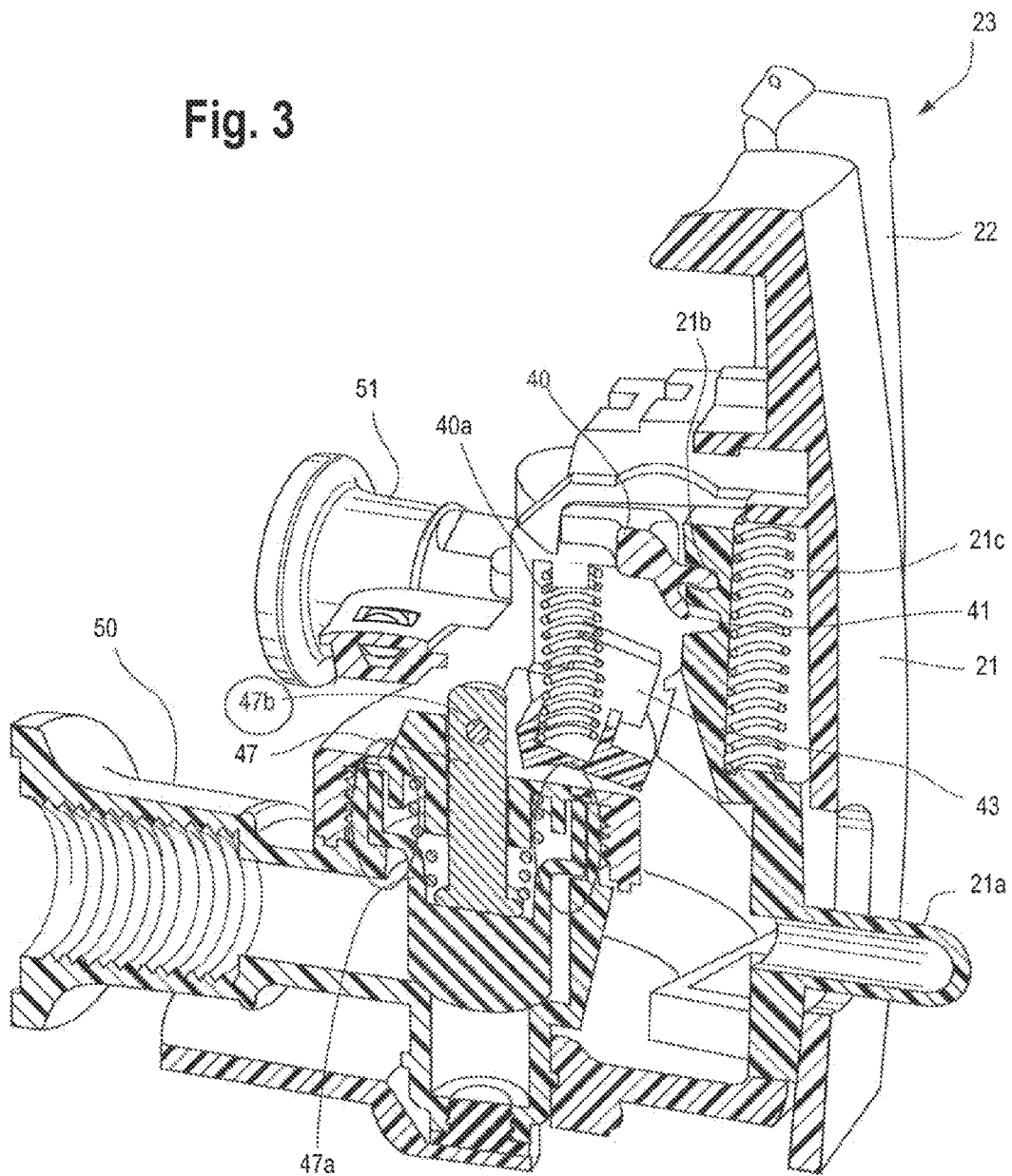
FIG. 3 is an enlarged side and partial-front cross-sectional view of one embodiment of the safety dispensing apparatus of the present invention.

Referring to FIG. 3, hot water intake tube 50 and cold water intake tube 51 are in fluid communication with dispensing nozzle or faucet 26.

Figure 4:
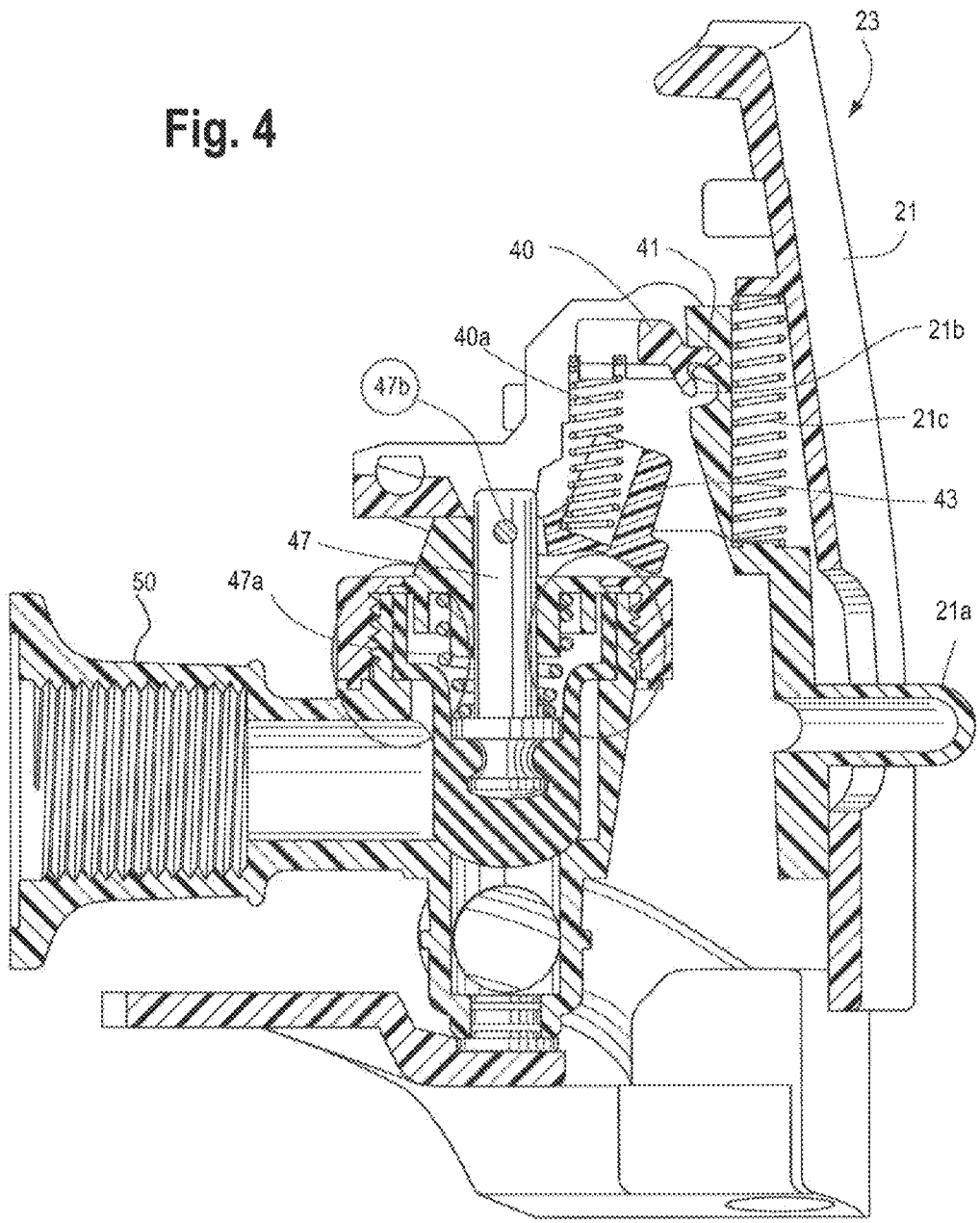
FIG. 4 is a side cross-sectional view showing the safety dispensing apparatus in a neutral, resting position.

Referring now to FIGS. 2-4 and dispensing apparatus 23, FIGS. 3-4 show child safety dispensing handle 21 in a neutral, resting position. Child safety pin 21a is in a "down" position, while stopper 40 is in an "up" position. Stopper 40 terminates in a "Y" shaped end 41, engageable to a male portion 21b of child safety handle 21 (a rack and pinion approach). Spring 21c ensures that child safety handle pin 21a is maintained in the normally "down" position shown. Stopper 40 is in constant engagement with male portion 21b of child safety handle 21, and is in the normally "up" position shown due to the position of safety handle 21 as shown. Pad 43 is spring-loaded, using spring 40a, to maintain handle 21 at its neutral angle, as shown. Spring-loaded plunger 47 is normally biased in the "down" position by spring 47a, interrupting the flow of hot water through tube 50.

Figure 5:
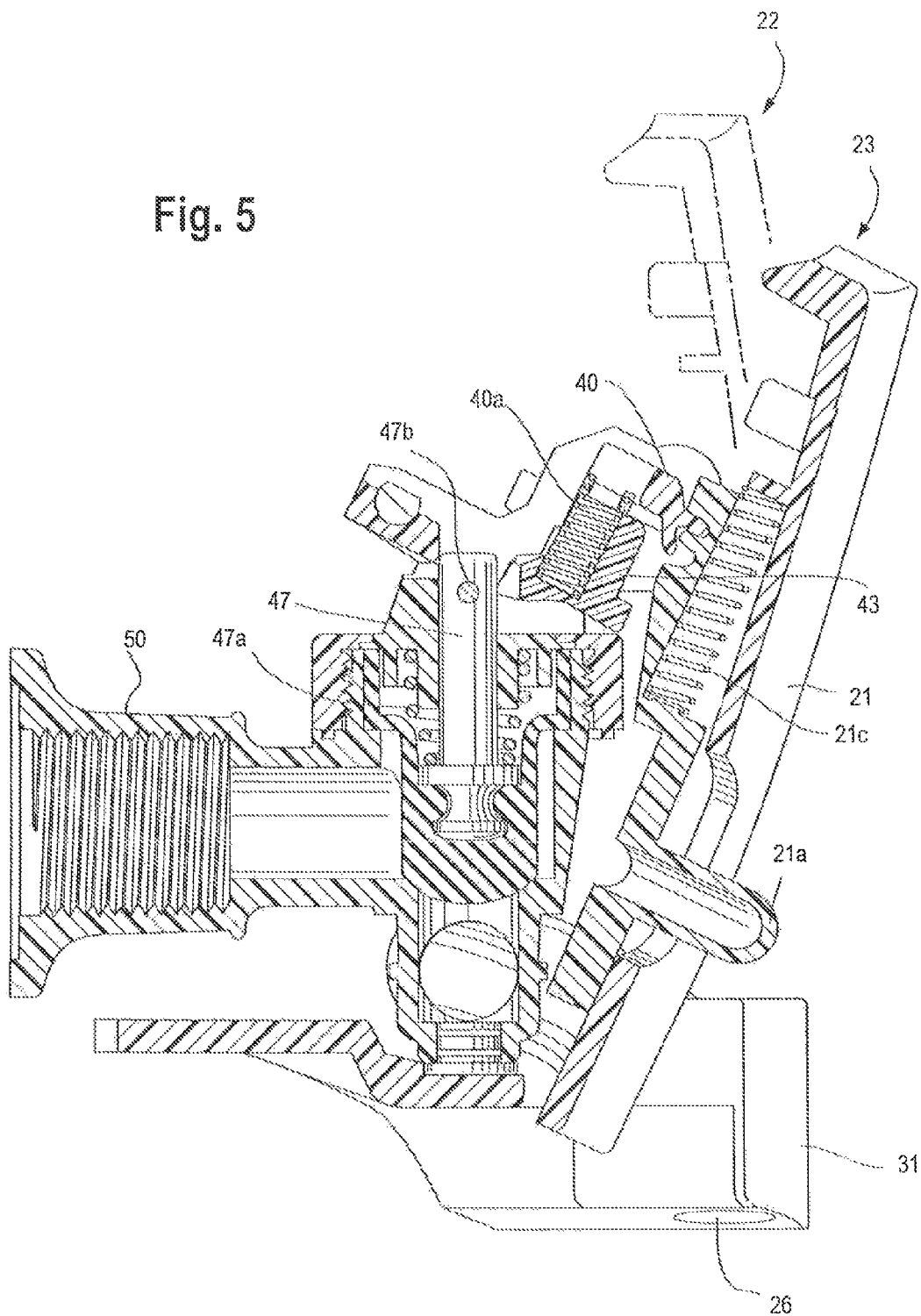
FIG. 5 is a view similar to FIG. 4, showing that the safety dispensing apparatus, when pulling out the faucet handle, will not dispense liquid.

Referring now to FIG. 5, it can be seen that simply pulling out child safety handle/lever 21 (i.e., rotating it clockwise about pin 47b, as shown), will not allow hot water to he dispensed from hot water tube 50. (Pin 47b is a part of plunger 47.) The reason is that pad 43 is permitted to freely rotate, without causing any corresponding movement of plunger 47.

Figure 6:
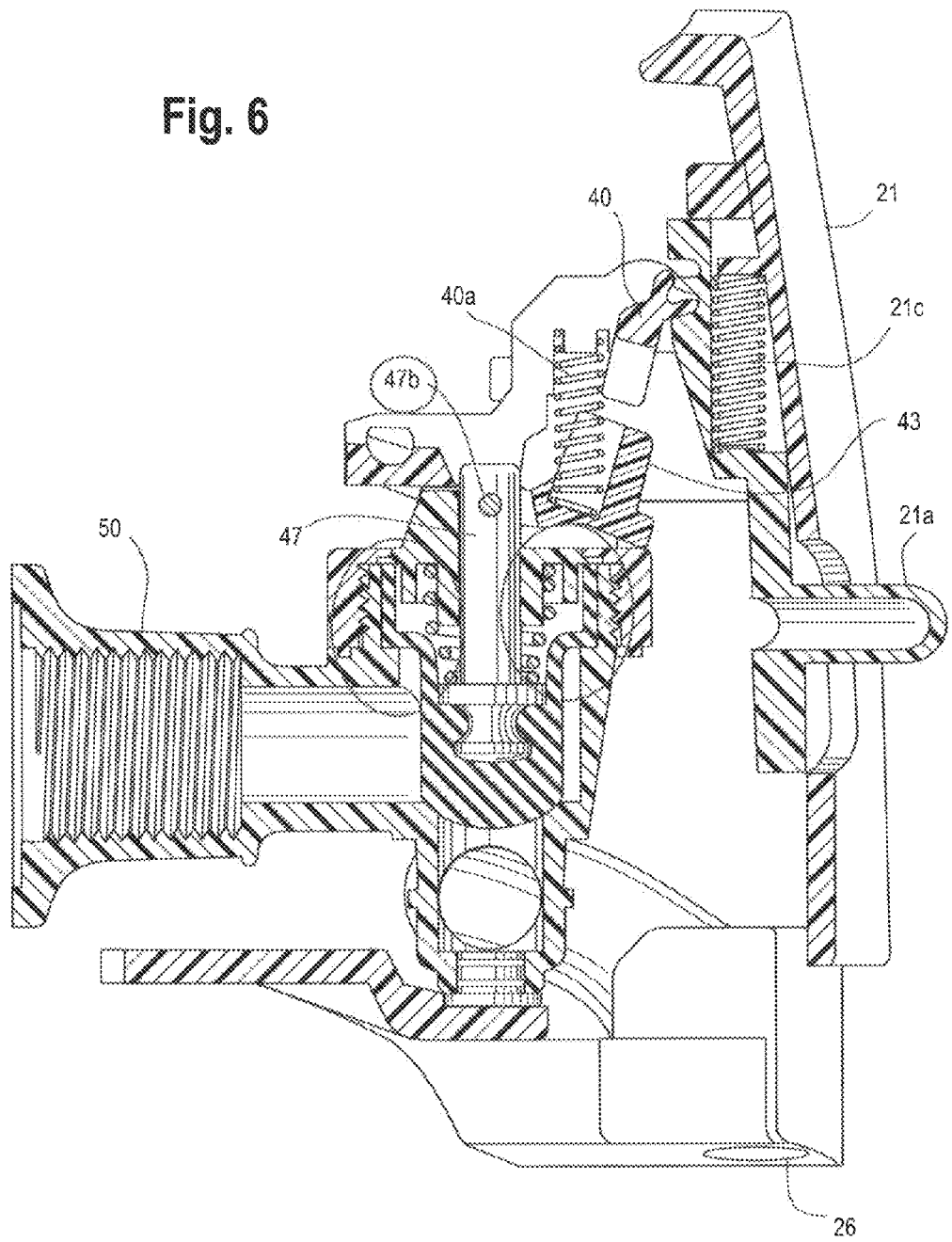
FIG. 6 is a view similar to FIG. 4, in which the child safety lever has been lifted up, moving the stopper to a rotated-down position.
Figure 7:
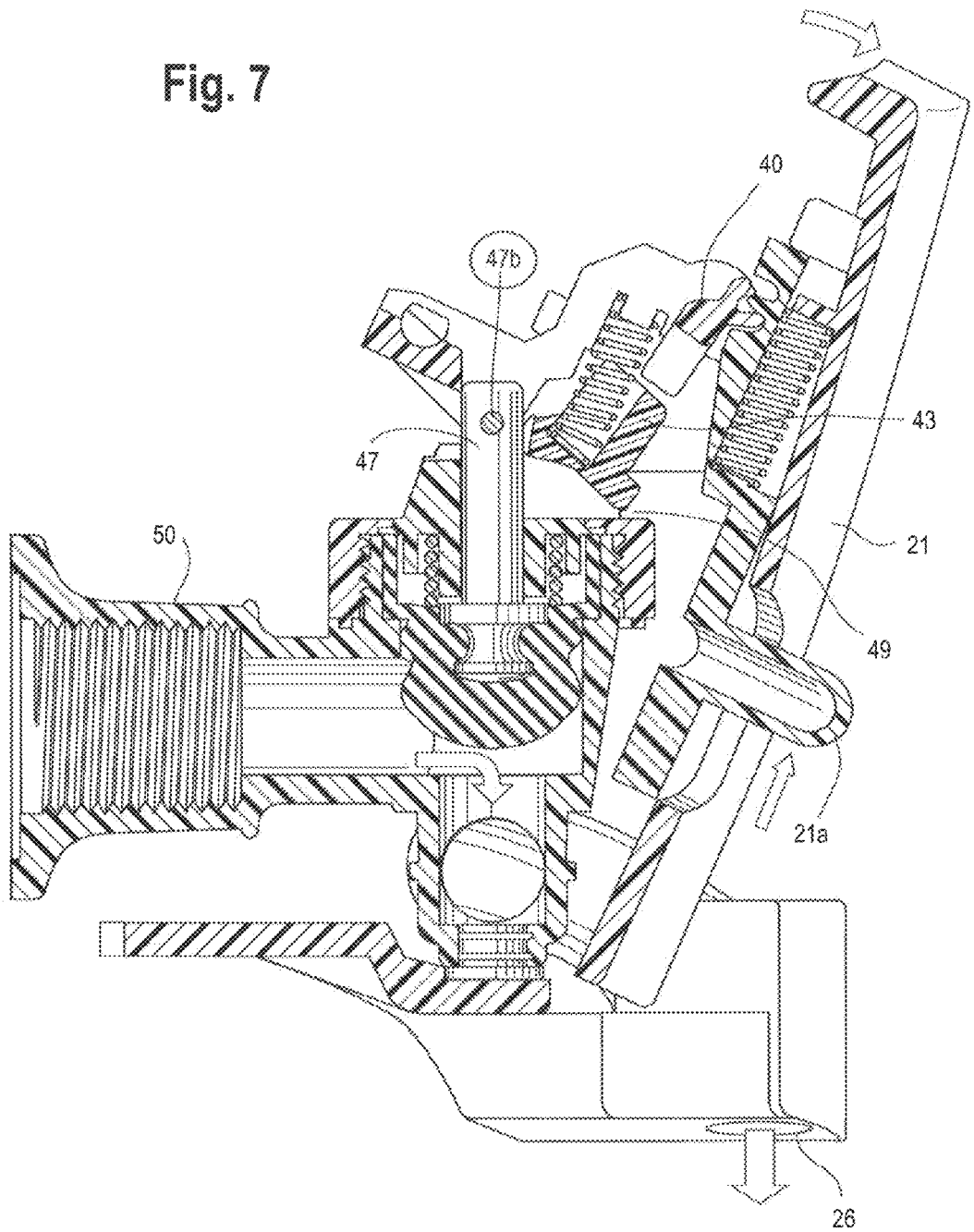
FIG. 7 is a view similar to FIG. 4, showing how the safety dispensing apparatus is moved to dispense liquid.

Referring now to FIG. 6, lifting up child safety lever/pin 21a rotates stopper counterclockwise in the direction of the arrow. The stopper's rotation constrains the movement of pad 43. Referring now to FIG. 7, by maintaining child safety lever/pin 21a in the raised position shown, and pulling out child safety faucet handle 21 in the (clockwise) direction of the arrow, as shown, stopper 40's position continues to constrain movement of pad 43, such that plunger 47 will be lifted upwardly (i.e., the "lever" works about fulcrum/pivot 49, such that as plunger 47 goes up, lever 21a goes down). This allows the flow of hot water through tube 50 in the direction of the arrow shown, and out through dispensing nozzle 26.

Figure 8:
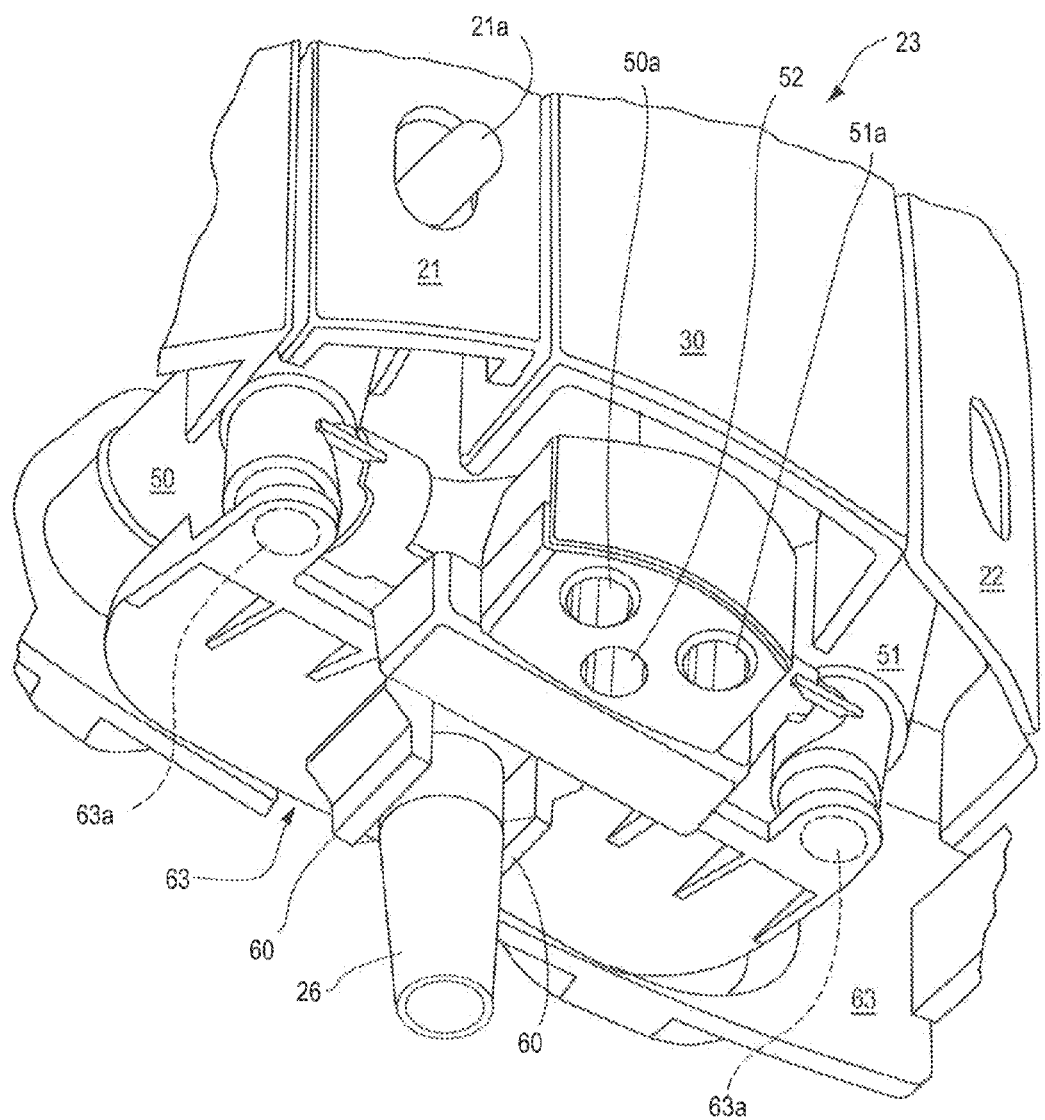
FIG. 8 is a side and bottom perspective view of the safety dispensing apparatus.

Referring to FIG. 8, hot water tube 50 is in liquid communication with hot water outlet 50a, while cold water tube 51 is in liquid communication with cold water outlet 51a. If another type or temperature of liquid is desired, such as sparkling water, an additional outlet 52 may be provided. Spout bracket 63 with through-holes 63a may be used to hold cold/hot/sparkling water or other liquids to be dispensed at one or more dispensing outlet(s) 26, which may be which may be attached such as to locking tabs 60.

Referring now to FIG. 9, another preferred embodiment of the improved child safety faucet assembly, designated generally with the reference numeral 100, is shown. In this exemplary embodiment, faucet assembly 100 includes main body 120, valve 200, and child safety dispensing handle/lever 150 with child safety lock 160. A liquid to be dispensed first enters main body 120 through inlet end 190, and may be dispensed through dispensing nozzle 153.

Referring to FIGS. 940, main body 120 may include inlet end 190 defining a threaded inlet passage 190a, and a horizontal body portion 140 defining horizontal inlet passage 140a. Valve body 200 may include a main valve body 121 defining an interior valve chamber 125, an upper portion or bonnet 130, and a dispensing nozzle or outlet end 153 defining outlet passage 153a. Bonnet 130 may be threadably attached to main valve body 121, as shown, to hold the valve in position. Operating stem or plunger 122 may pass through a central opening in bonnet 130 and terminate in flanges 123 and 124, which retain valve element 170. Spring 144 surrounds and normally biases operating stem 122 in the normal (downward) operating position shown in FIG. 10.

An upper portion of operating stem/plunger 122 may be pivotably connected to rear portion 253 of dispensing lever 150, at pivot 122a. A medial portion 154 of dispensing lever 150, in between rear portion 253 and front, distal portion 155, may include: a lever depression 152, suitably sized to be depressed by the human thumb or index finger; and lock abutments 151, Lock abutments may work as a stopper, so that when handle/lever 150 is depressed without disengaging child safety lock 160, lock end 160a will contact one or more lock abutments 151 and stop. Child safety lock 160 may include a pivot-spring catching rod 160, which rotates about lock pivot 163 located on lever 150. One end 161a of spring 161 may be carried by spring housing 162; the other end 161b of spring 161 may be rigidly connected to an opposite end 162a of spring housing 162.

Figure 11:
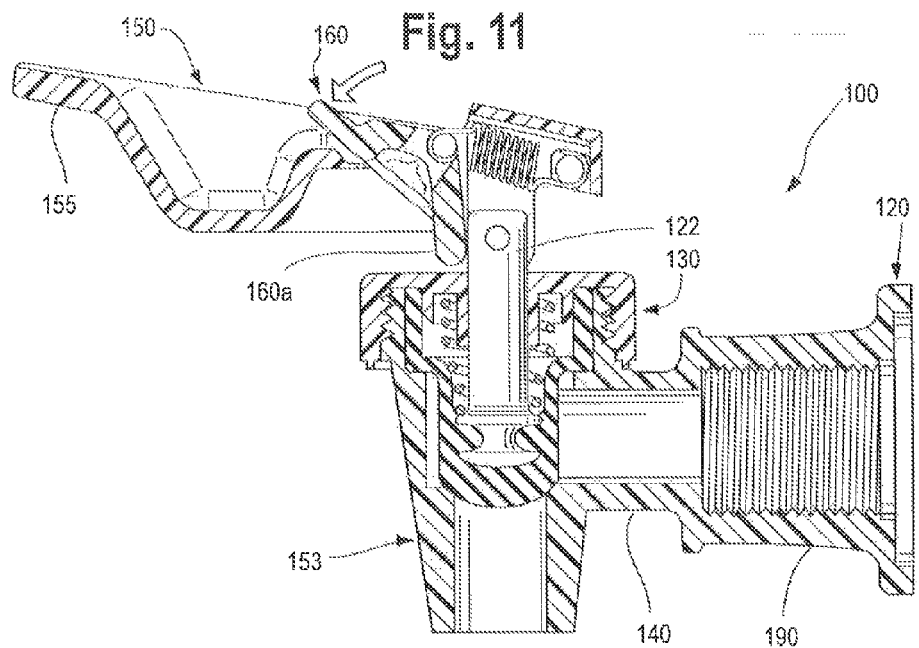
FIG. 11 is a view similar to FIG. 10 in which the safety lock has been depressed and rotated, overriding the biasing spring force.
Figure 12:
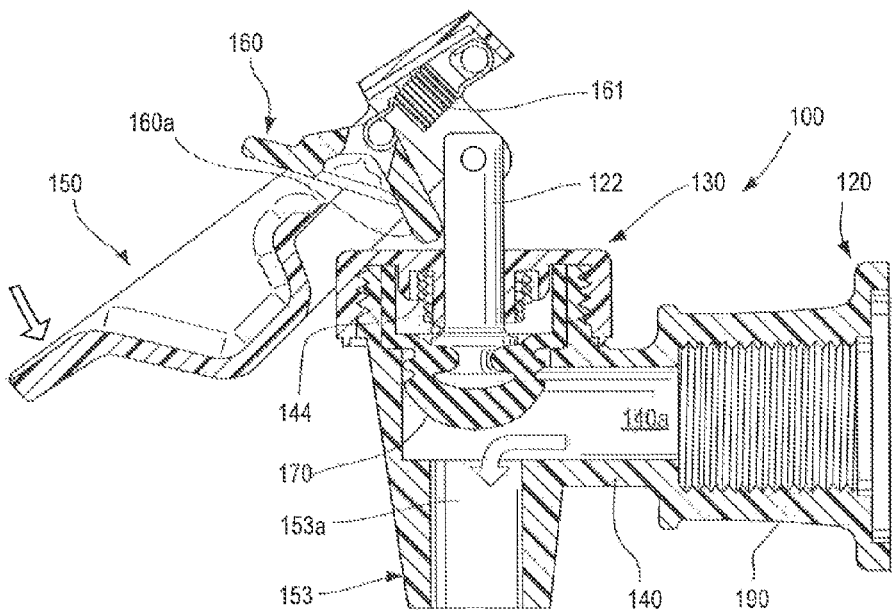
FIG. 12 is a view similar to FIG. 10 in which both the dispensing lever and the safety lock have been depressed and rotating into a dispensing position.

In operation, in order to commence liquid dispensing, the fluid communication passage joining inlet passage 140a and outlet passage 153a must be opened. To accomplish this, faucet assembly 100 requires simultaneous, combined actions, as now explained, This is accomplished by moving child safety lock 160 in the direction of the arrow shown in FIG. 11, toward front, distal end 155 of dispensing lever 150, and also simultaneously pressing down on dispensing lever 150 (i.e., both child safety lock 160 and dispensing lever 150 are simultaneously rotated counterclockwise, as seen in FIG. 12).

Figure 13:
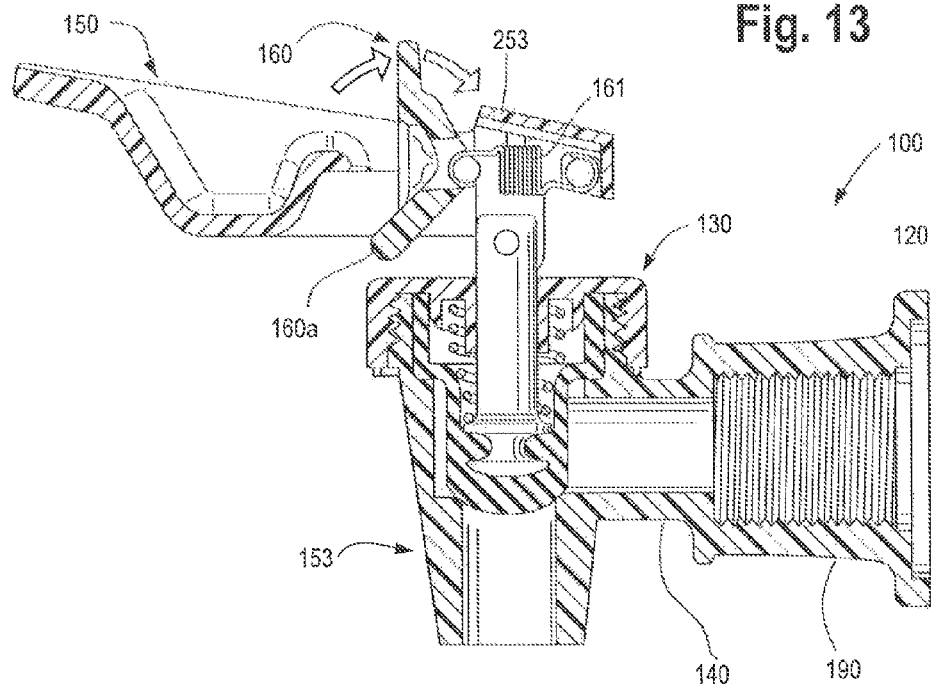
FIG. 13 is a view similar to FIG. 10 in which the safety lock is shown in the act of returning to its original position.
Figure 14:
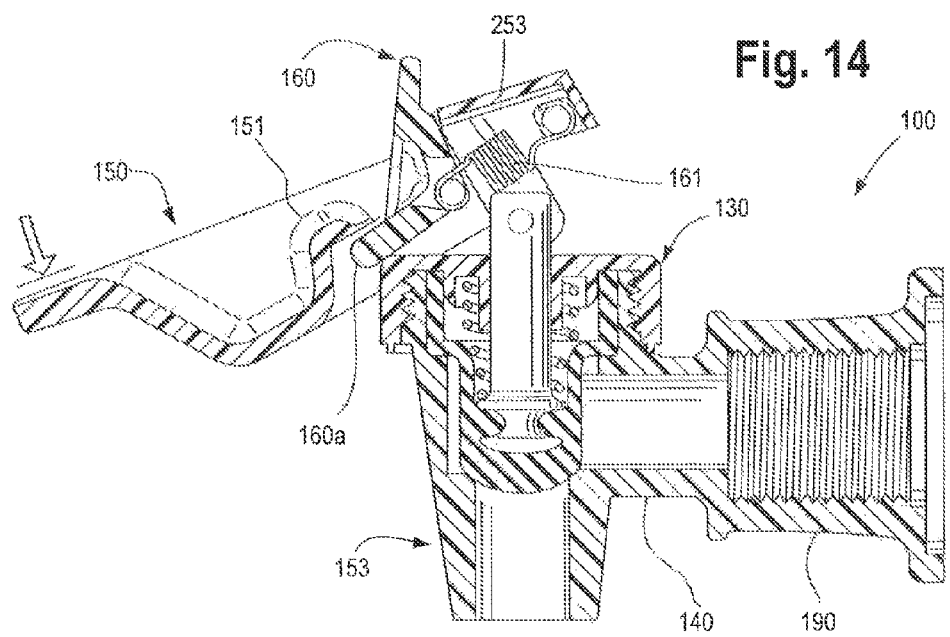
FIG. 14 is a view similar to FIG. 10 in which the safety lock has not been depressed and rotated before the dispensing lever is depressed into a dispensing position, which will not result in dispensing.
Figure 17:
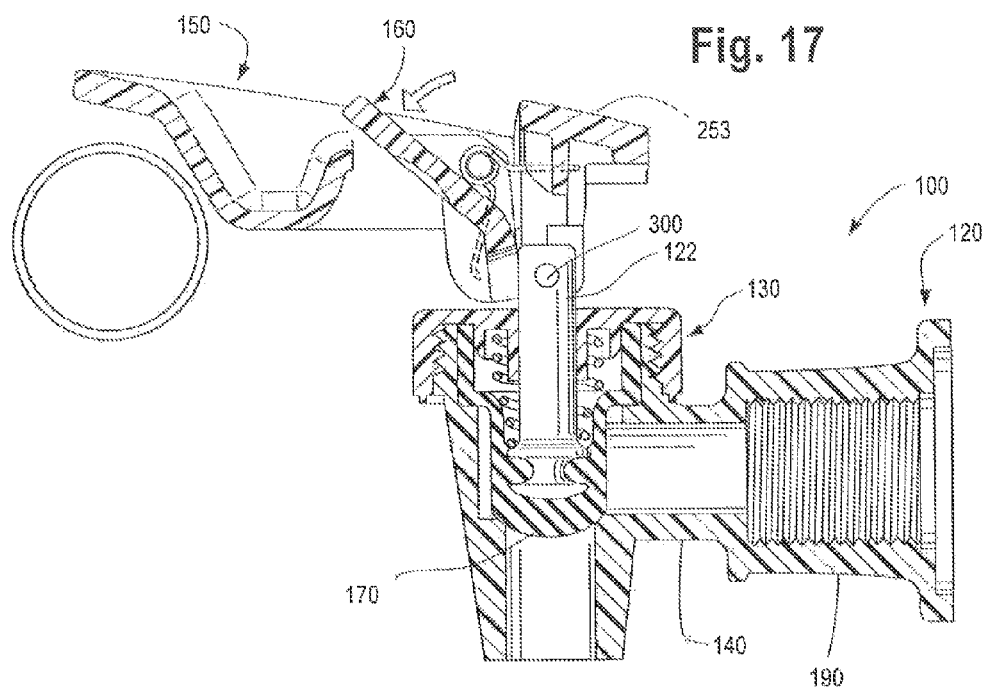
Figure 18:
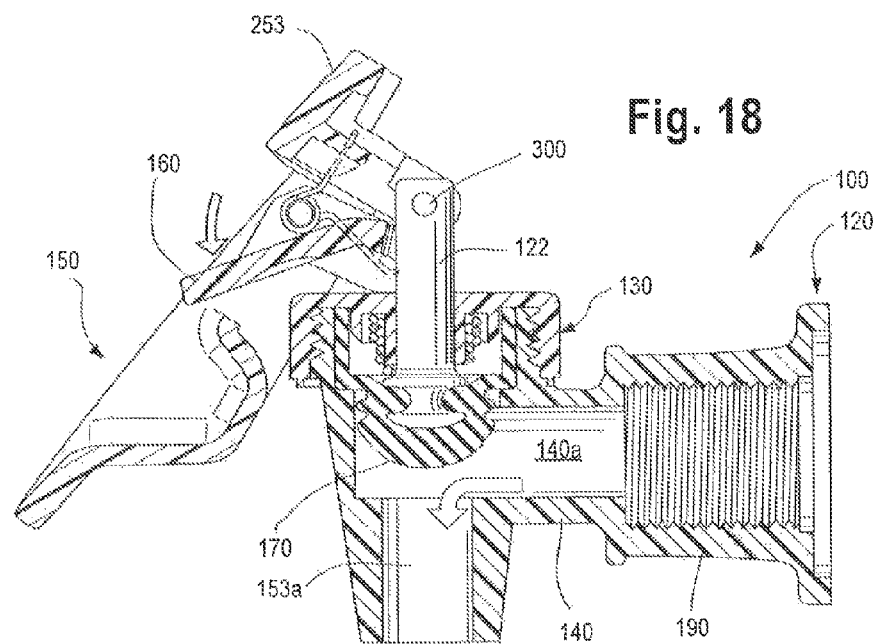
FIG. 18 is a side, cross-sectional view of the safety dispensing apparatus of FIG. 15, shown in an open, dispensing position.

Referring now to FIGS. 13-14, in these views safety lock 160 has not been depressed and rotated before dispensing lever 150 is rotated rearwardly (FIG. 14). Dispensing will not be permitted here, as bottom portion 160a of safety lock 160 will be contacted by the top surface of bonnet 130, preventing full rotation of lever 150 such that stem 122 will be prevented from lifting up, preventing dispensing. It can be seen that the counterclockwise rotation of safety lock 160 is required so that when dispensing lever 150 is rotated counterclockwise, appropriate leverage will be provided to act on plunger 122, raising it and moving valve 170 upward so that valve 170 no longer blocks the passageway between inlet 140a and outlet 153a.

Once dispensing commences, the user can release the child safety lock (which will remain in place) and continue dispensing simply by continuing to depress the dispensing lever; dispensing will now continue until the user releases the dispensing lever. This provides more a user-friendly dispensing without compromising the child safety function.

Following dispensing, upon release of dispensing lever 150, the force from spring 144 will move operating stem/plunger 122 downward again, placing lever 150 in its normal, neutral position and causing valve element 170 to once again block any fluid. communication passage between inlet passage 140a and outlet passage 153a, as shown in FIG. 13. Using spring 161, spring-loaded child safety lock 160 will also revert back to its neutral position (shown in FIG. 13), as well.

Referring to FIGS. 10 and 15, the upper front/distal 155 and medial 152 portions of dispensing lever 150 preferably have multiple, curved surfaces ergonomically designed for ease in depressing the lever using the thumb, for example (although fingers may be used, as well). Once lever 150 is depressed, these surfaces are also designed to facilitate continued depression without requiring the user to rotate his/her hand to an awkward position in order to fully depress the lever and continue dispensing.

An advantage of the present invention is the added safety feature that both lock 160 and lever 150 must be actuated before dispensing will occur. Depressing/rotating only lock 160 (in either direction), or only lever 150 (in either direction), will not actuate dispensing. Also, lock 160 is preferably sufficiently spaced from the distal and medial portions of lever 150 so that any inadvertent pressing on lever 150 is unlikely to actuate lock 160, as required for dispensing.

A conventional faucet may be used for dispensing of cold liquids, although in certain environments (e.g., in environments where dispensing of any liquid, hot or cold, can have serious consequences), it may be desirable to use a faucet according to the principles of the present invention for cold liquid dispensing, as well.

Figure 19:
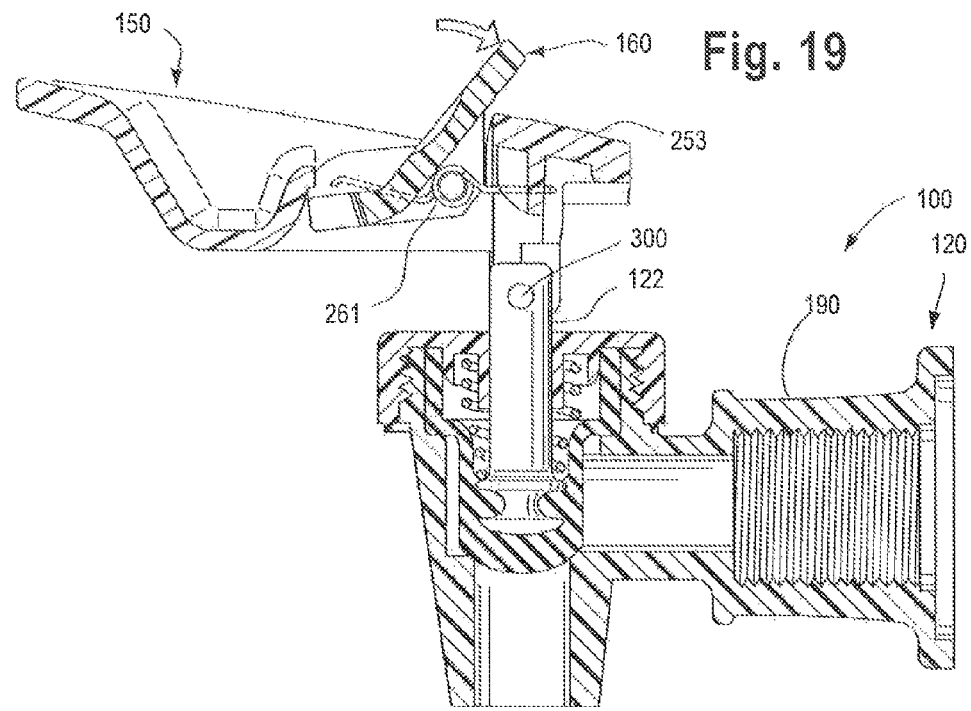
FIGS. 19-20 are side, cross-sectional views of the safety dispensing apparatus of FIG. 15, once again shown in closed, non-dispensing positions.
Figure 19A:
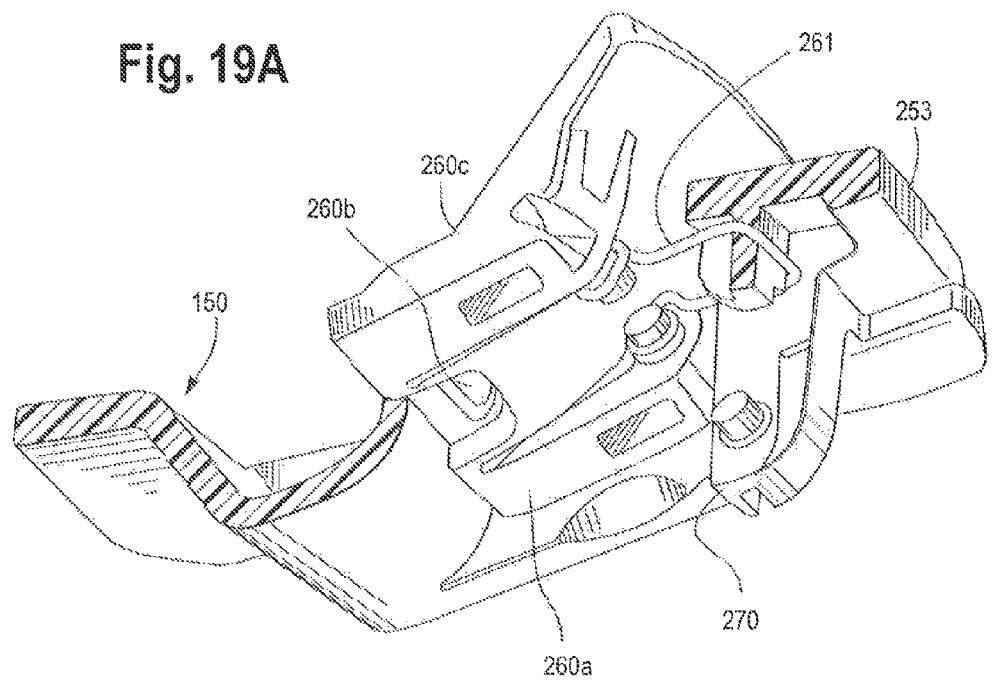
FIG. 19A is an enlarged, side and bottom perspective view of a preferred child safety lever and associated lock, as shown in FIG. 15.
Figure 20:
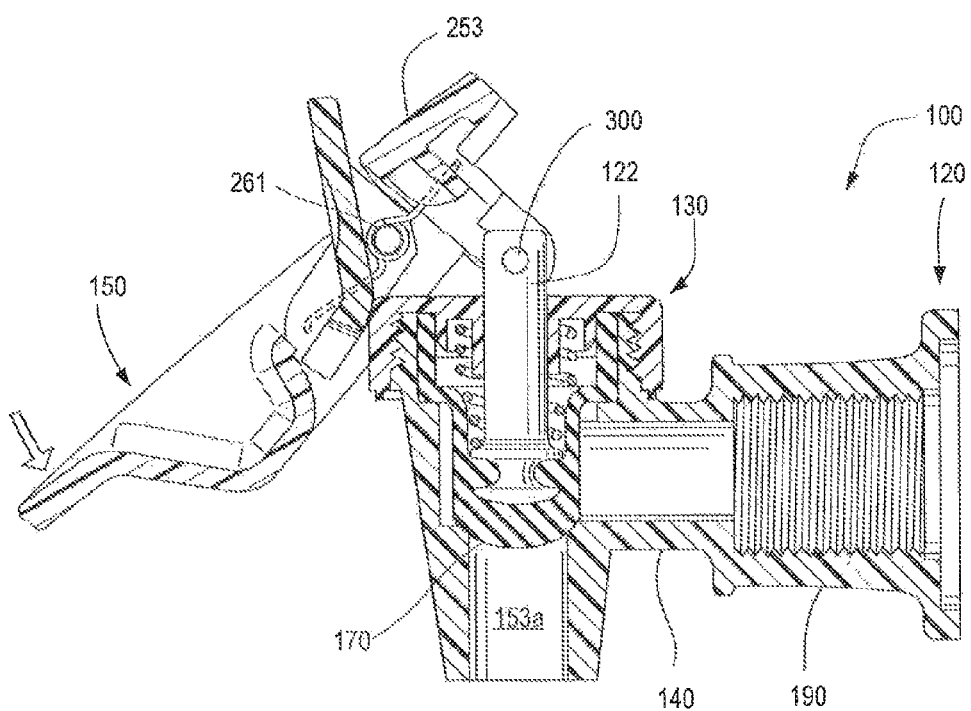

Referring now to FIGS. 15-20, a similar child-safety lock to that of FIGS. 9-14 is shown, However, in this embodiment, an extension spring 261 rather than a torsional spring is used, and a different fulcrum for the child safety portion is used. Thus, in the embodiment shown in FIGS. 9-14, end 160a of lock 160 has a flat shape, and sits against plunger 122 (FIG. 12) when child safety lever 150 is rotated counterclockwise. In the embodiment shown in FIGS. 15-20 (see, e.g., FIG. 19A), end 260a of lock 260 includes a cutout portion 260b, and two ribs 260c. As a consequence of the different design, with the embodiment of FIGS. 15-20, as child safety lever 150 is rotated counterclockwise, lock end 260a (instead of contacting plunger 122 as with the embodiment of FIGS. 9-14) contacts front surface 270 of rear portion 253 of lever 150 (again see FIG. 19A). Once the handle is rotated counterclockwise about fulcrum 300 with the child safety lock disengaged (see FIG. 17), plunger 122 will be moved upwardly, allowing liquid to be dispensed.

The above description is not intended to limit the meaning of the words used in the following claims that define the invention. Other systems, methods, features, and advantages of the present invention will be, or will become, apparent to one having ordinary skill in the art upon examination of the foregoing drawings, written description and claims, and persons of ordinary skill in the art will understand that a variety of other designs still falling within the scope of the following claims may be envisioned and used. For example, consumable liquids other than water, such as but not limited to sparkling water, coffee and carbonated beverages, may also be dispensed. Further, the disclosed or claimed child-safety lever could be associated with additional or other dispensing, such as cold-water dispensing, coffee dispensing, alcoholic dispensing, etc. It is contemplated. that these or other future modifications in structure, function or result will exist that are not substantial changes and that all such insubstantial changes in what is claimed are intended to be covered by the claims.

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

We claim:

1. A liquid dispensing apparatus with a child-safety feature rendering dispensing more difficult to commence, comprising:
    a valve having an inlet and an outlet, the valve inlet defining a valve inlet axis and being in fluid communication with a source of liquid to be dispensed, and the valve outlet terminating in a nozzle or other suitable liquid dispensing end;
    a plunger capable of reciprocating movement between dispensing and non-dispensing positions, the plunger movement defining a plunger axis normal to the valve inlet axis;
    a manually-manipulable dispensing handle that is movable, only by exerting a force directly on the handle, from a non-dispensing position to a dispensing position;
    a manually-manipulable lever that is movable relative to the handle in a direction which is not normal to the plunger axis, only by exerting a force directly on the lever, from a non-dispensing position to a dispensing-ready position in which dispensing may be permitted;
    the dispensing handle being manually movable independently of a position of the lever, and the lever being manually movable independently of a position of the dispensing handle when the dispensing handle is in the dispensing position;
    wherein the liquid can only be dispensed by first manually moving the lever to its dispensing-ready position and then, while maintaining the lever in its dispensing-ready position, manually moving the handle to its dispensing position.

2. The liquid dispensing apparatus of claim 1, further comprising a stopper engaging the lever.

3. The liquid dispensing apparatus of claim 2, further comprising a spring-loaded pad, wherein when the handle and the lever are each independently moved, the stopper constrains movement of the pad.

4. The liquid dispensing apparatus of claim 3, wherein when the handle and the lever are each independently moved and the stopper constrains movement of the pad, the plunger is moved to the dispensing position allowing liquid to be dispensed through the valve outlet.

5. The liquid dispensing apparatus of claim 4, wherein when only the handle and not the lever is manually manipulated, the plunger is maintained in the non-dispensing position.

6. The liquid dispensing apparatus of claim 3, wherein the pad is spring-biased to a position allowing the handle to be in the non-dispensing position when the handle is not being manually manipulated.

7. The liquid dispensing apparatus of claim 3, wherein the handle can be rotated about a pivot comprising the pad.

8. The liquid dispensing apparatus of claim 7, wherein the lever is capable of rotating with the handle.

9. The liquid dispensing apparatus of claim 1, wherein the liquid to he dispensed is hot water.

10. The liquid dispensing apparatus of claim 1, wherein the lever is normally spring-biased to the non-dispensing position when the lever is not being manually manipulated.

11. A method of safely dispensing a liquid, comprising the steps of:
    providing a valve having an inlet and an outlet, the valve inlet defining a valve inlet axis and being in fluid communication with a source of liquid to be dispensed, and the valve outlet terminating in a nozzle or other suitable liquid dispensing end;
    providing a manually-manipulable dispensing handle that is movable, only by exerting a force directly on the handle, from a non-dispensing handle position to a dispensing handle position, and a manually-manipulable lever that is movable relative to the handle, only by exerting a force directly on the lever, from a non-dispensing lever position to a dispensing-ready position in which dispensing may be permitted, wherein the dispensing handle is manually movable independently of a position of the lever, and the lever is manually movable independently of a position of the dispensing handle when the dispensing handle is in the dispensing position;

providing a plunger capable of reciprocating movement between plunger dispensing and non-dispensing positions, the plunger movement defining a plunger axis normal to the valve inlet axis, and the plunger normally being located in the plunger non-dispensing position blocking the valve outlet; and wherein the liquid can only be dispensed by first manually moving the lever in a direction which is not normal to the plunger axis and to the dispensing-ready position, and then, while maintaining the lever in the dispensing-ready position, manually moving the dispensing handle to its dispensing position, thereby causing the plunger to move to the plunger dispensing position in which the plunger no longer blocks the valve outlet, allowing liquid to be dispensed through the valve outlet.

12. The method of claim 11, further comprising a stopper engaging the lever, and a spring-loaded pad, wherein when the handle and the lever are each independently moved, the stopper constrains movement of the pad, and the plunger is moved to the dispensing position.

13. The method of claim 12, wherein the handle is rotated about a pivot comprising the pad.

14. The method of claim 11, wherein when only the handle and not the lever is manually manipulated, the plunger is maintained in the non-dispensing position.

15. The method of claim 11, wherein the lever is capable of rotating with the handle.

\* \* \* \* \*